(12) United States Patent
Sartori et al.

(10) Patent No.: US 6,798,418 B1
(45) Date of Patent: Sep. 28, 2004

(54) GRAPHICS SUBSYSTEM INCLUDING A RAMDAC IC WITH DIGITAL VIDEO STORAGE INTERFACE FOR CONNECTION TO A GRAPHICS BUS

(75) Inventors: Gabriele Sartori, Fremont, CA (US); Dale E. Gulick, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/577,527

(22) Filed: May 24, 2000

(51) Int. Cl.[7] ............................................. G06F 13/14
(52) U.S. Cl. ..................................................... 345/519
(58) Field of Search ........................... 375/240, 240.27; 345/509, 643, 519, 506, 558, 420, 419, 501, 522, 520; 326/38; 710/26, 312, 305, 200, 56, 22, 52; 701/208; 711/147; 370/263

(56) References Cited

U.S. PATENT DOCUMENTS

| | | | |
|---|---|---|---|
| 5,099,331 A | | 3/1992 | Truong |
| 5,798,770 A | | 8/1998 | Baldwin |
| 5,821,918 A | * | 10/1998 | Reinert et al. ............... 345/643 |
| 6,008,821 A | | 12/1999 | Bright et al. |
| 6,020,901 A | * | 2/2000 | Lavelle et al. ............... 345/509 |
| 6,091,778 A | * | 7/2000 | Sporer et al. ................ 375/240 |
| 6,145,025 A | * | 11/2000 | Lim ............................. 710/22 |
| 6,201,834 B1 | * | 3/2001 | Zhu ........................ 375/240.27 |
| 6,219,725 B1 | * | 4/2001 | Diehl et al. .................... 710/26 |
| 6,433,579 B1 | * | 8/2002 | Wang et al. ................... 326/38 |
| 6,442,477 B1 | * | 8/2002 | Okada ......................... 701/208 |

FOREIGN PATENT DOCUMENTS

| WO | WO 97/39437 | 10/1997 |
|---|---|---|
| WO | WO 00/28518 | 5/2000 |

OTHER PUBLICATIONS

Specification for ADV478/ADV471, Analog Devices, Inc., pp. 1–12.

* cited by examiner

Primary Examiner—Matthew C. Bella
Assistant Examiner—Dalip K. Singh
(74) Attorney, Agent, or Firm—Meyertons Hood Kivlin Kower & Goetzel, P.C.; B. Noël Kivlin; Stephen J. Curran (57) ABSTRACT

A graphics subsystem including a RAMDAC for connection to a graphics bus implemented on an integrated circuit chip separate from a graphics processor. In one embodiment, the graphics processor is configured to render digital image information in response to graphics commands and to store the digital image information in a memory. The RAMDAC IC includes a conversion unit, which includes a color mapping unit and a digital-to-analog converter and is configured to convert a representation of the digital image information into one or more analog signals for driving a video display. The graphics subsystem further includes a Direct Memory Access (DMA) controller implemented on the second integrated circuit chip. The DMA controller is configured to generate read requests to retrieve the digital image information stored in the memory to thereby cause the digital image information to be provided to the conversion unit. The DMA controller is further configured to generate write cycles to cause digital RGB display data received from the color mapping unit, in the conversion unit, to be provided for storage in a specified region of memory. In another embodiment, the graphics subsystem may include a digital video interface implemented on the second integrated circuit chip. The digital video interface is configured to receive digital RGB display data from the color mapping unit and to provide an encoded digital video output to a digital video output port. The digital video interface is further configured to receive encoded digital video from a digital video input port and to provide decoded digital display data for storage on devices such as a digital VCR.

36 Claims, 9 Drawing Sheets

GRAPHICS SUBSYSTEM INCLUDING A RAMDAC IC WITH DIGITAL VIDEO STORAGE INTERFACE FOR CONNECTION TO A GRAPHICS BUS

BACKGROUND OF THE INVENTION

1. Field of the Invention

This invention relates to computer systems and, more particularly, to graphics generation subsystems and RAMDAC circuits.

2. Description of the Related Art

In general, computer systems include a CPU, system memory, and a plurality of peripheral devices such as video graphics adapters and serial communications controllers. The memory and peripheral devices are typically coupled to the microprocessor through one or more system buses. In Personal Computers (PCs), these buses are controlled by bridge logic, which is commonly separated into two distinct Integrated Circuits (ICs): the system controller and the peripheral bus controller. The system controller commonly referred to as a northbridge in PC systems, includes such devices as a memory controller and one or more high-speed packet-based bus controllers. The peripheral bus controller commonly referred to as a southbridge in PC systems, includes such devices as a power management subsystem, a serial bus controller and an interrupt controller.

Computer system graphics are typically generated by a graphics processor sometimes referred to as a graphics accelerator. The graphics processor is typically a specialized processor, which creates digital images through the use of graphics software drivers. The drivers interpret high-level commands sent to the graphics processor by the main system CPU. The graphics processor then renders the images using more complex rendering commands, thereby reducing the processing needs of the main CPU. The images are broken up into frames of data that can be individually displayed. The graphics processor then stores the frames in a temporary storage memory known as a frame buffer. The frame buffer may be a standalone video memory connected directly to the graphics processor, or it may be a part of the system memory, which has been allocated for use as a frame buffer, as is the case in a Unified Memory Architecture.

Before the digital frames can be displayed on a Cathode Ray Tube (CRT) display, they must be converted to analog signals. For a color display, the digital frame signals are broken up into the three primary colors: red, green and blue (RGB). A special circuit, referred to as a RAMDAC or Palette DAC, accomplishes the digital-to-analog conversion using a random access memory (RAM) look-up table and a digital-to-analog converter (DAC) for each of the three colors. In many cases, the look-up table stores RGB color values associated with 256 different colors. The digital frame data contains RGB color index values for each pixel. When a specific index in the look-up table is accessed, the corresponding digital RGB color value is written to the DAC for conversion.

Although the RAMDAC provides the analog RGB signals, the CRT also needs timing signals including vertical and horizontal synchronization, which synchronize the frames on the display. The graphics processor generates the display timing. In a typical graphics system where the RAMDAC is part of the graphics processor, the timing signals generated by the graphics processor and the analog RGB signals generated by the RAMDAC are sent directly to the display.

Recently, highly integrated processor chips have been proposed which may integrate a CPU and a graphics processor as well as a memory controller and bridging logic normally associated with the northbridge onto one integrated circuit chip.

There are difficulties involved with manufacturing the RAMDAC on the same integrated circuit chip as a CPU. The analog manufacturing process differs from the process used to manufacture a digital CPU core, and sometimes there are supply voltage differences between the digital and the analog subsections. Additionally, the digital noise generated by a CPU can be difficult to filter from the analog subsection.

Therefore, to overcome these manufacturing issues, RAMDAC circuits have been proposed which are manufactured on separate integrated circuit chips than the CPU and graphics processor. In systems employing such standalone circuits, the graphics processor and the RAMDAC operate in a master and slave configuration, respectively. In this configuration, the graphics processor generates all the CRT timing signals and digital frames. The graphics processor also acts as a direct memory access (DMA) controller by causing retrieval of frame data from the frame buffer and then allowing the data to be available to the RAMDAC. This configuration is also known as a push mode configuration because the graphics processor pushes the data to the RAMDAC.

Increased system CPU speeds have made video capture, editing and display available on a PC. Video data may come from a plurality of sources such as a video camera, a Digital Video Disk (DVD), or TV broadcast. The capture of the video data is normally done at the graphics processor. The graphics processor captures the video data and merges the video frames with the graphics frames from the frame buffer and then sends them to the RAMDAC for display. The merging of the video and graphics, which is generally referred to as overlaying, allows the two to be displayed together. Once the video images are captured and displayed, it may be desirable to edit the combined images. It may also be desirable to store the image being displayed on a storage device such as a hard disk or a digital video cassette recorder (VCR).

SUMMARY OF THE INVENTION

The problems outlined above may in large part be solved by a graphics subsystem including a RAMDAC, which is implemented on an integrated circuit chip separate from a graphics processor, for connection to a graphics bus.

In one embodiment, a graphics processor implemented on a first integrated circuit chip is configured to render digital image information in response to graphics commands and to store the digital image information in a memory. The graphics commands may be received, for example, from a main CPU within a computer system associated with the graphics subsystem. A conversion unit is further provided on a second integrated circuit chip, which includes a color mapping unit and a digital-to-analog converter. The color mapping unit may include a RAM look-up table and is configured to convert the digital image information into digital RGB display data. The digital-to-analog converter is coupled to convert the digital RGB display data into one or more analog signals for driving a video display. The graphics subsystem further includes a Direct Memory Access (DMA) controller implemented on the second integrated circuit chip. The DMA controller is configured to generate read requests to retrieve the digital image information stored in the memory and to thereby cause the digital image information to be provided to the conversion unit. The DMA controller is further configured to generate write cycles to cause the digital RGB display data to be written to a designated region of memory. The operating system may then transfer the digital RGB display data from the memory into a storage device such as a hard disk drive.

In another embodiment, the graphics subsystem may include a digital video interface implemented on the second integrated circuit chip. The digital video interface is configured to receive the digital RGB display data from the conversion unit and to provide an encoded digital video output to a digital video output port. The digital video interface is further configured to receive encoded digital video from a digital video input port and to provide decoded digital RGB display data for storage and/or subsequent display.

In an additional embodiment, a video stream interface and a graphics and video combiner unit may be implemented on the second integrated circuit chip. The video stream interface is coupled to a local video input port and is configured to provide video image frame data for storage in a local frame store memory, which is also implemented on the second integrated circuit chip. The graphics and video combiner unit is coupled to the conversion unit and is configured to provide digital image information combined with video image frame data to the conversion unit.

In another embodiment, the graphics subsystem may include a display clock generator unit coupled to a programmable timing control register unit implemented on the second integrated circuit chip. The programmable timing control register unit receives information from the main system CPU. The display clock generator unit is configured to generate display timing signals, such as the horizontal and vertical synchronization signals based on information stored in the programmable timing control register unit.

The graphics subsystem may advantageously overcome manufacturing problems associated with processing the RAMDAC and CPU on the same integrated circuit chips. Additionally, the graphics subsystem may advantageously allow a plurality of video streams to be concurrently displayed with computer graphics on a CRT and to store the display data to such devices as a hard disk or digital video cassette recorder (VCR). The stored images may be edited and redisplayed at a later time or combined with additional computer graphics and video streams.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE PREFERRED EMBODIMENTS

Figure 1:
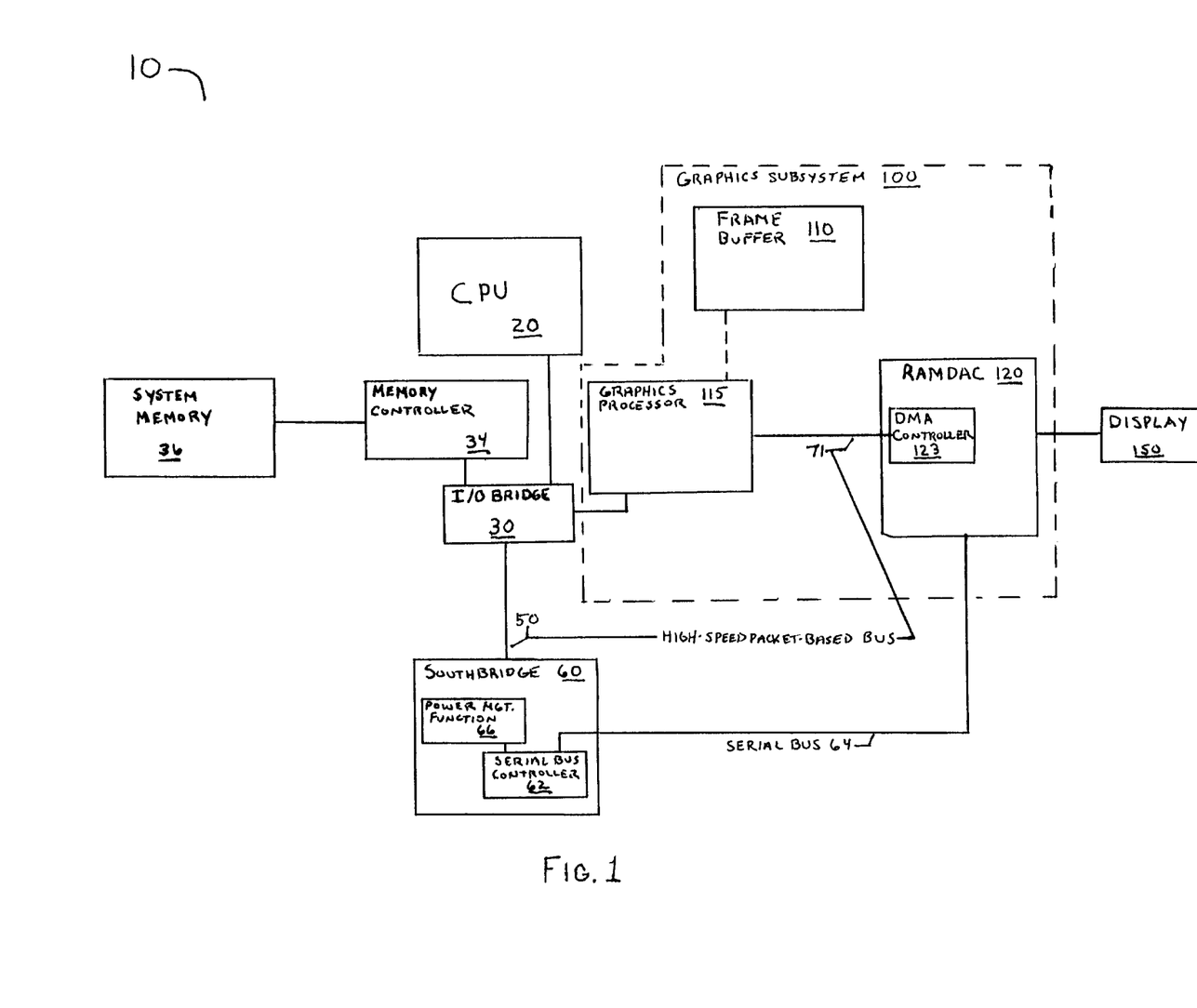
FIG. 1 is a block diagram of one embodiment of a computer system.

Referring now to FIG. 1, a block diagram of one embodiment of a computer system 10 is shown. Computer system 10 includes a CPU 20 coupled to a system memory 36 through a memory bus 38 and a memory controller 34. CPU 20 is also coupled to a southbridge 60 through an I/O bridge 30 and a peripheral bus, which in this embodiment is a high-speed packet-based bus 50. A graphics processor 115 is also coupled to CPU 20.

CPU 20 is illustrative of, for example, an x86 microprocessor such as a Pentium™ or Athlon™ microprocessor. It is understood, however, that a system according to the present invention may employ other types of microprocessors.

Southbridge 60 includes a serial bus controller 62 and a power management controller 66. Southbridge 60 is coupled to a graphics subsystem 100 through a serial bus 64, such as an I²C™ bus or a SMBus™ bus.

As will be described in greater detail in FIG. 2, one embodiment of the graphics subsystem 100 includes a graphics processor 115 implemented on a first integrated circuit (IC) chip, a RAMDAC 120 implemented on a second integrated circuit chip, and a memory known as a frame buffer 110.

Figure 2:
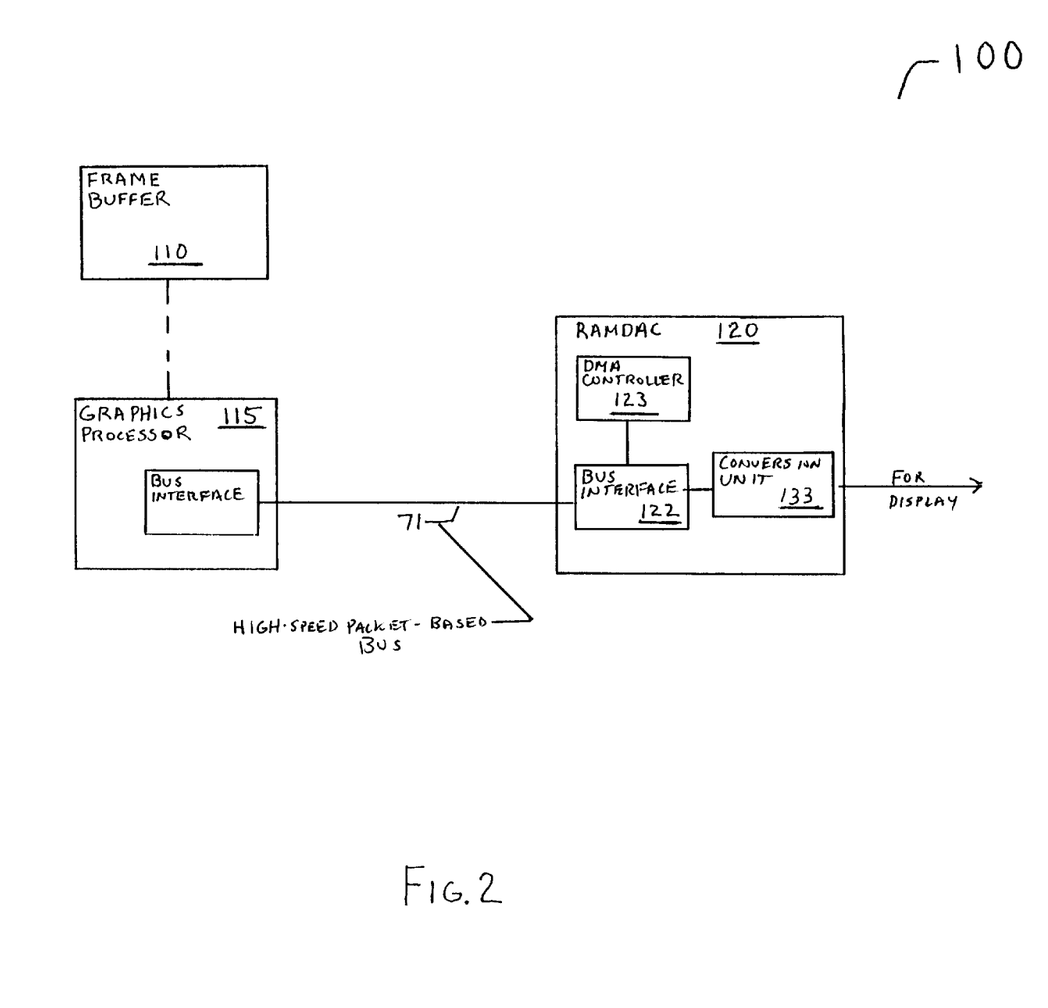
FIG. 2 is a block diagram that illustrates one embodiment of a graphics subsystem.

FIG. 2 is a block diagram of one embodiment of a graphics subsystem 100. Circuit components that correspond to those shown in FIG. 1 are numbered identically for simplicity and clarity. The graphics subsystem 100 of FIG. 2 includes a graphics processor IC 115 coupled to a RAMDAC IC 120 through a high-speed packet-based bus 71. Graphics processor 115 is also coupled to a frame buffer memory 110. RAMDAC 120 is a standalone IC including an integrated bus interface 122 coupled to a DMA controller 123. RAMDAC 120 also includes a conversion unit 133 coupled to bus interface 122.

Referring collectively to FIG. 1 and FIG. 2, in response to high-level graphics commands from system CPU 20, the graphics processor 115 generates digital images commonly referred to as frames using low-level graphics driver software and stores those frames in frame buffer memory 110. The system CPU 20 may send display resolution information to RAMDAC 120 through serial bus 64, or alternatively, system CPU 20 may send display resolution information to RAMDAC 120 through high-speed packet-based bus 71. As will be discussed in further detail in FIG. 3, this resolution information is used to configure clock and display timing signals internal to RAMDAC 120. As conversion unit 133 converts the digital frames and provides the analog signals for a display 150, DMA controller 123 generates address read commands requesting the next digital frame from frame buffer 110, thereby pulling the data from frame buffer 110. DMA controller 123 advantageously allows RAMDAC 120 to operate in a pull mode.

Figure 3:
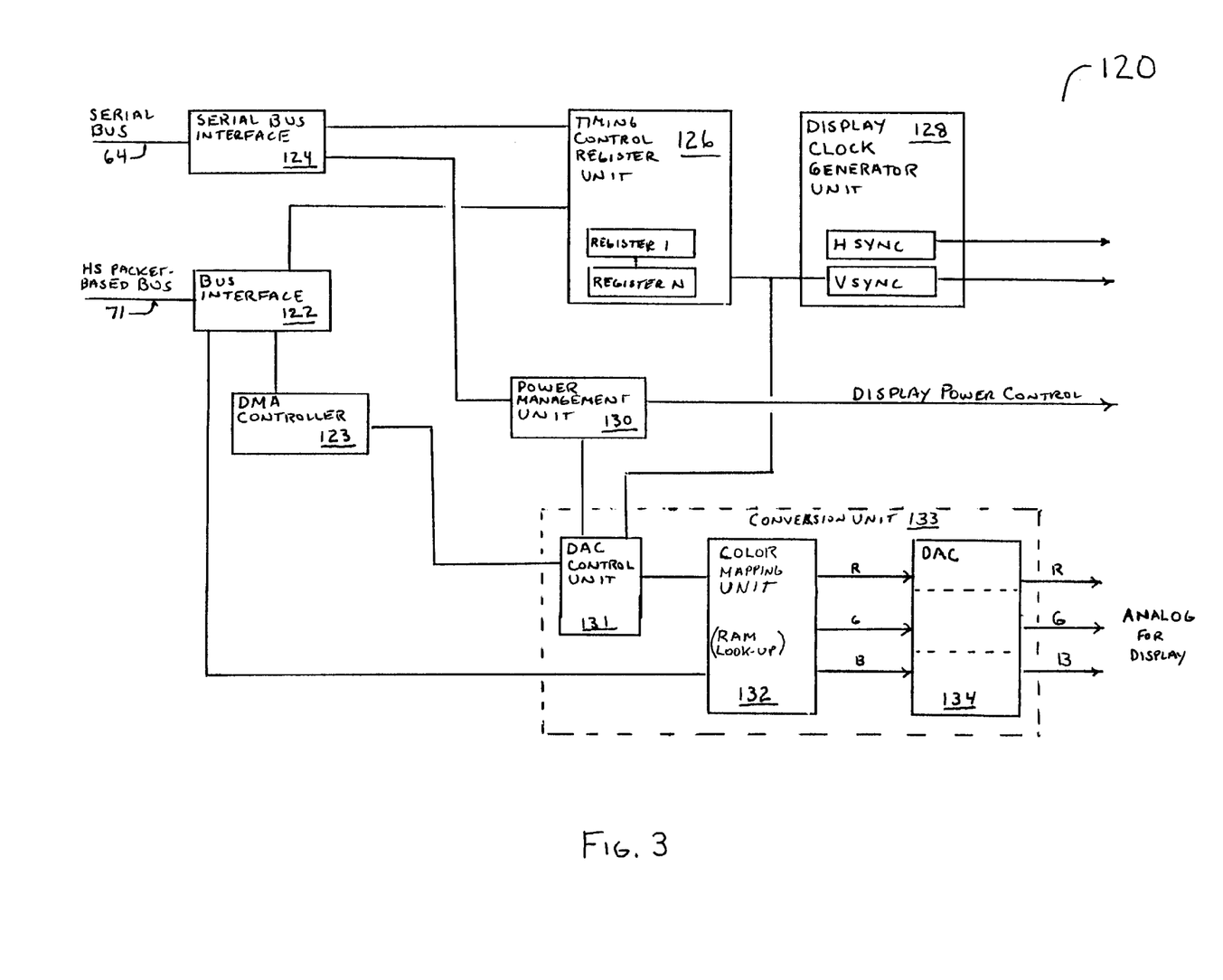
FIG. 3 is a diagram of one embodiment of a pull mode RAMDAC.

Turning now to FIG. 3, a block diagram of one embodiment of the pull mode RAMDAC 120 of FIG. 2 is shown. Circuit components that correspond to those shown in FIG. 2 are numbered identically for simplicity and clarity. A bus interface 122 and a DMA controller 123 are coupled to high-speed packet-based bus 71 allowing the graphics processor 115 of FIG. 2 to transfer data to RAMDAC 120. Bus interface 122 is coupled to a conversion unit 133, which includes a color mapping unit 132, which may be implemented as a RAM look-up table, a DAC control unit 131 and a DAC circuit 134. DAC control unit 131 is coupled to DMA controller 123. Color mapping unit 132 is coupled to DAC circuit 134. A serial bus interface 124 is coupled to a timing control register unit 126. A display clock generator unit 128 is also coupled to timing control register unit 126. A power management unit 130 is coupled to serial bus interface 124.

Along with the analog representation of the digital frames, a CRT display also needs horizontal and vertical synchronization signals, which synchronize the updating of the pixels on the display. The display clock generator unit 128 provides the vertical and horizontal synchronization signals for use by the display and by the internal circuitry of RAMDAC 120. Timing control register unit 126 includes programmable registers, which store display resolution and timing information in response to instructions executed by the system CPU 20 of FIG. 1. This information configures display clock generator unit 128 to generate specified horizontal and vertical refresh frequencies. The information also formats the output of DAC 134 with the proper resolution for the selected display.

In addition to the system CPU 20 of FIG.1 programming RAMDAC 120 with display information through the serial bus 64 of FIG. 1, southbridge 60 of FIG. 1 may also send commands, through serial bus 64, to power management unit 130 to control RAMDAC 120 outputs.

In response to DAC 134 requiring a digital color value to convert, DMA controller 123 initiates an address read cycle to frame buffer I 10. When the corresponding digital frame data arrives, bus interface 122 routes the data to color mapping unit 132, where the frame data is digitally separated into the three primary colors: red, blue and green. DAC 134 converts the digital values of each color into the analog voltage levels required by the display.

Figure 4:
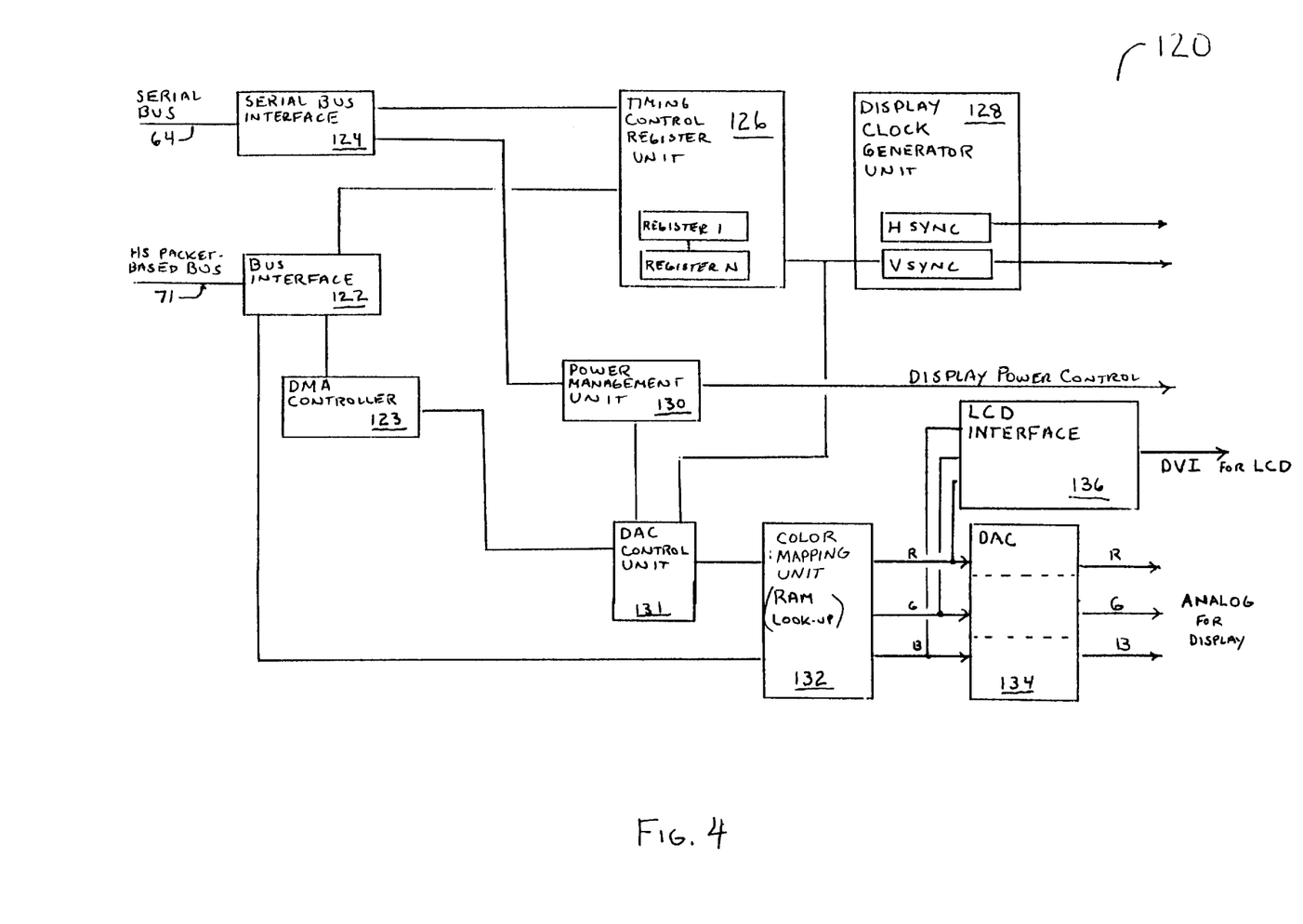
FIG. 4 is a diagram of another embodiment of a pull mode RAMDAC with the addition of one embodiment of an LCD interface.

FIG. 4 is a block diagram of another embodiment of the pull mode RAMDAC 120 of FIG. 3 with the addition of an LCD interface 136. Circuit components that correspond to those shown in FIG. 3 are numbered identically for simplicity and clarity. The operation of the circuit of FIG. 4 is similar to that described above in conjunction with FIG. 3; however, in the circuit of FIG. 4, the operation of the additional LCD interface 136 is described.

The digital RGB outputs of color mapping unit 132 are coupled to LCD interface 136. The digital output of LCD interface 136 is provided for an LCD. The digital output of look-up table 132 is formatted by LCD interface 136 to advantageously allow direct connection to an LCD, thereby eliminating the necessity of analog-to-digital circuitry within many conventional LCD units.

Figure 5:
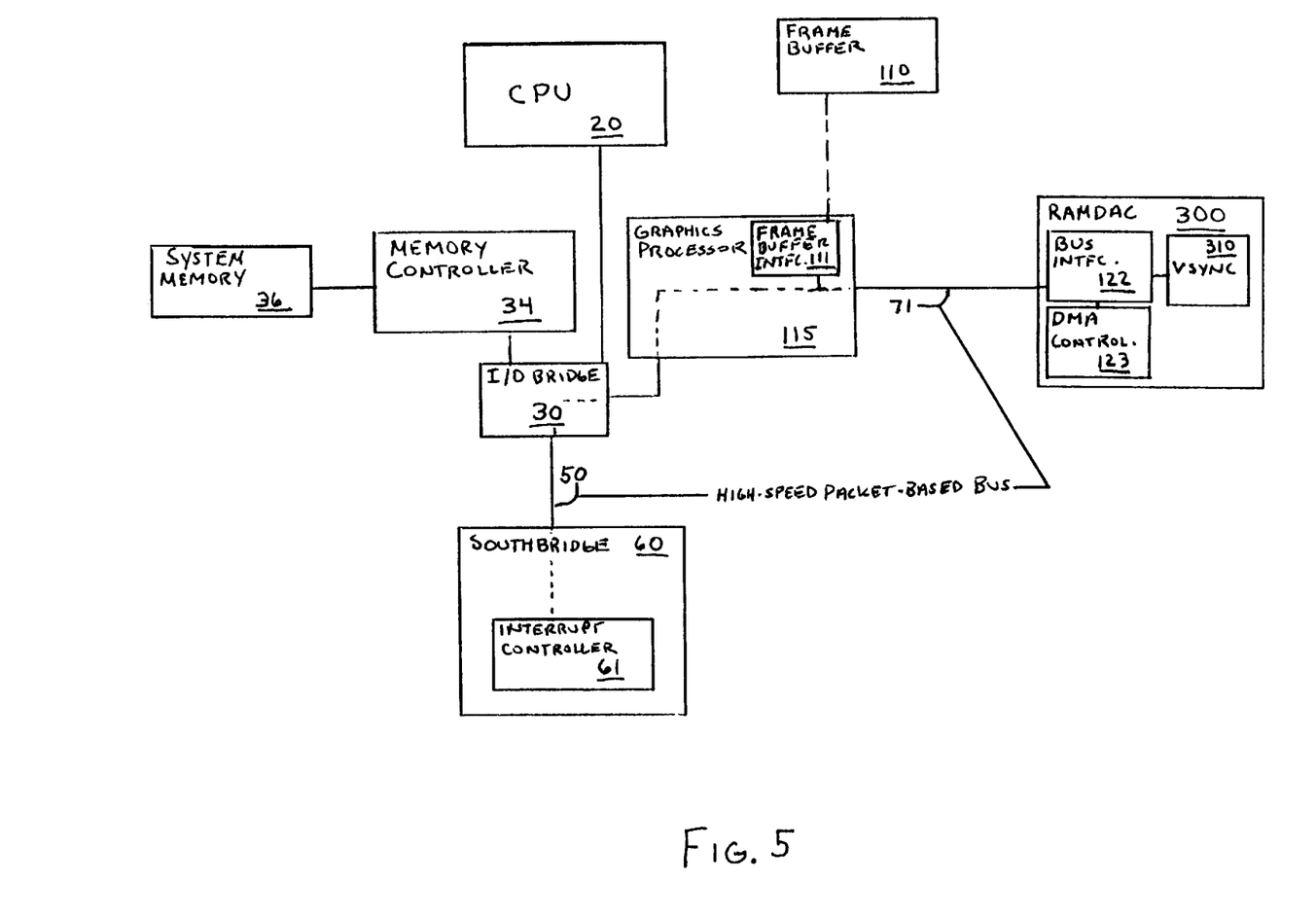
FIG. 5 is a block diagram of another embodiment of a computer system including one embodiment of a pull mode RAMDAC including a dedicated vertical synchronization signal output.

Referring now to FIG. 5, a block diagram of one embodiment of the pull mode RAMDAC of FIG. 1 with the addition of a dedicated vertical synchronization (vsync) signal output is illustrated. Circuit components that correspond to those shown in FIG. 1 are numbered identically for simplicity and clarity.

A RAMDAC 300 is coupled to a graphics processor 115 through a high-speed packet-based bus 71. Graphics processor 115 is operatively coupled to a southbridge 60 through high-speed packet-based bus 50.

As described above in FIG.3, display clock generator unit 128 generates a vsync signal for display timing. In FIG. 5, since both the graphics processor 115 and a CPU 20 require notification of the occurrence of a vsync signal, the vsync signal is routed to both graphics processor 115 and an interrupt controller 61 within southbridge 60. Graphics processor 115 requires the vsync signal for digital frame buffer synchronization. Interrupt controller 61 generates an interrupt to CPU 20, which causes CPU 20 to execute an interrupt service routine associated with generating graphics subsystem. In this embodiment, the vsync signal is sent by RAMDAC 300 to both graphics processor 115 and southbridge 60 through high-speed bus 71 and 50 respectively, in the form of a packet, thereby advantageously saving an interrupt pin.

It is noted that in alternative embodiments, the vsync signal may be provided by RAMDAC 300 as a dedicated output and routed to graphics processor 115 as a wire. Graphics processor 115 may then send a corresponding vsync interrupt signal to southbridge 60 through high-speed bus50 in the form of a packeted message, thereby saving an interrupt pin.

Figure 6:
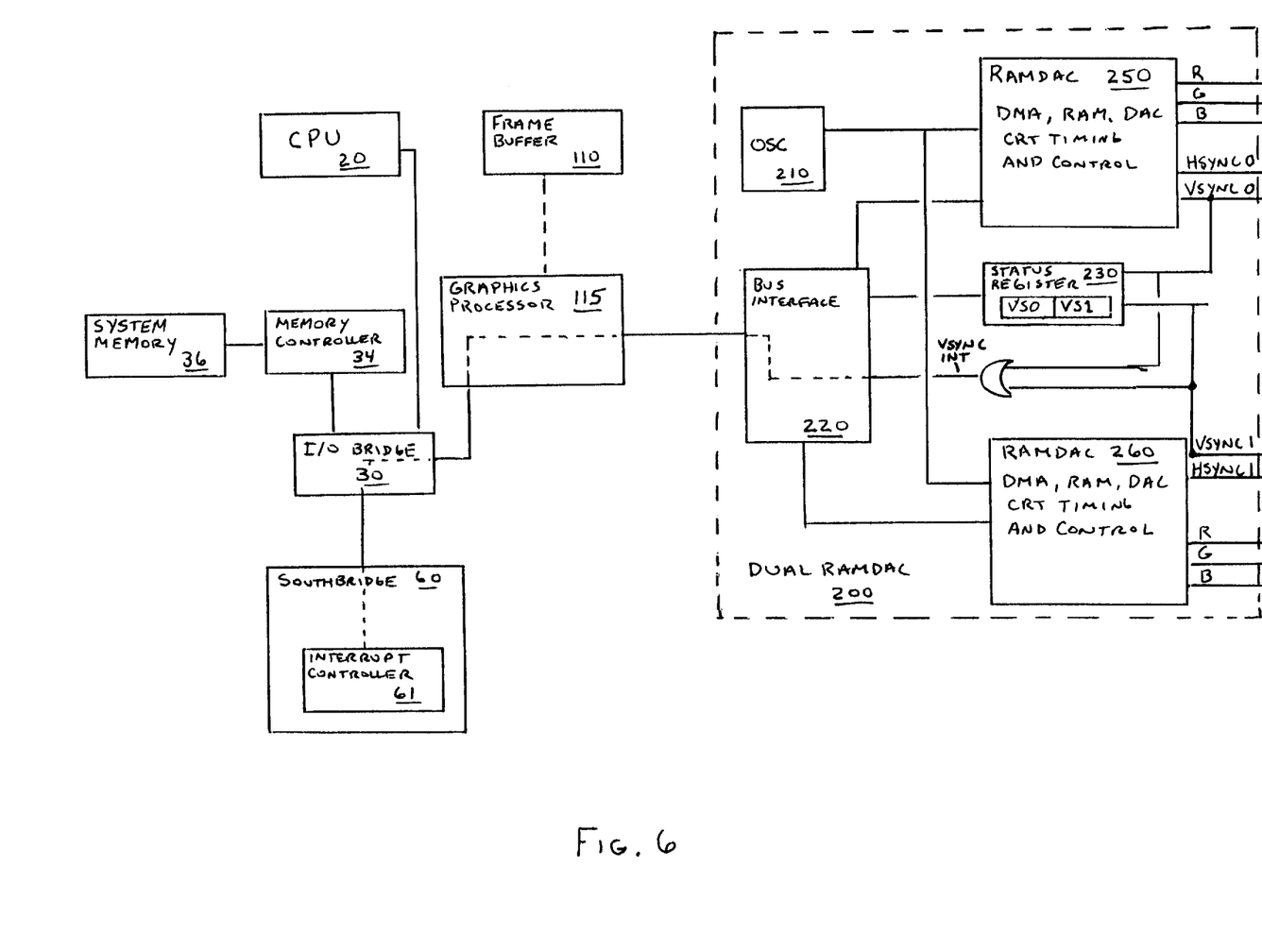
FIG. 6 is a block diagram of one embodiment of a dual pull mode RAMDAC.

FIG. 6 is an embodiment of a dual pull mode RAMDAC integrated circuit chip. Circuit components that correspond to those shown in FIG. 1 through FIG. 5 are numbered identically for simplicity and clarity. In this illustration, the RANDAC integrated circuit chip includes two functionally equivalent pull mode RAMDAC circuits, RAMDAC 250 and RAMDAC 260. The dual RAMDAC integrated circuit chip 200 is coupled to the graphics processor 115 described above in FIGS. 1–5. Both RAMDAC 250 and RAMDAC 260 may contain circuits as described above in FIG. 3 and FIG. 4, including a DMA controller 123, a color mapping unit 132, a DAC 134, a display clock generator unit 128, and a timing control register unit 126. The following additional circuitry is coupled to both RAMDAC 250 and RAMDAC 260: A high-speed bus interface 220 coupled to a graphics processor 115 through a high-speed packet-based bus 71. An oscillator clock circuit (OSC) 210. A status register 230. A vertical sync interrupt circuit 240 coupled to bus interface 122.

Each RAMDAC is independently programmable through a timing control register unit 126 as described above in FIG. 3. This independent control advantageously allows simultaneous use of two CRT displays with different resolutions.

During system operation, the vsync signal from each of RAMAC 250 and RAMDAC 260 is communicated back to an interrupt controller 61 in a southbridge 60 as a vsync interrupt as described above in the vsync description of FIG. 5. Typically, two vsync signals would require two vsync interrupt inputs to interrupt controller 61.

However, in this embodiment, status register 230 includes a pair of status bits, which serve to monitor the vsync output of RAMDAC 250 and RAMDAC 260. In each instance, when either of RAMDAC 250 and RAMDAC 26 generates a vsync signal, the corresponding vsync bit in status register 230 is set to a logic value of one. The vsync signals are also coupled to the output of a vertical sync interrupt circuit 240.

The output of vertical sync interrupt circuit 240 is analogous to the vsync interrupt described above in FIG. 5.

In this embodiment, the vertical sync interrupt circuit is shown as a logical OR function. However, it should be noted that any Boolean circuit equivalent to the logical OR function may be used. This combining of the vsync signals advantageously saves one interrupt input to interrupt controller 61. When CPU 20 receives the interrupt request, CPU 20 executes an interrupt service routine, which reads status register 230 to find out which bits are set corresponding to which RAMDAC generated the vsync signal. CPU 20 then executes a corresponding interrupt service routine. The status bits in status register 230 are cleared in response to CPU 20 reading status register 230.

Due to the high bandwidth of the data streams present with two RAMDAC circuits, graphics processor 115 may compress the frame data prior to sending the graphics data to RAMDAC 200. A simple compression technique may be used. For example, for 24-bit pixel data, which represents eight bits per color, a 32-bit word could be sent, wherein the first 3 bytes specify the color and the last byte specifies the number of times to repeat it.

Figure 7:
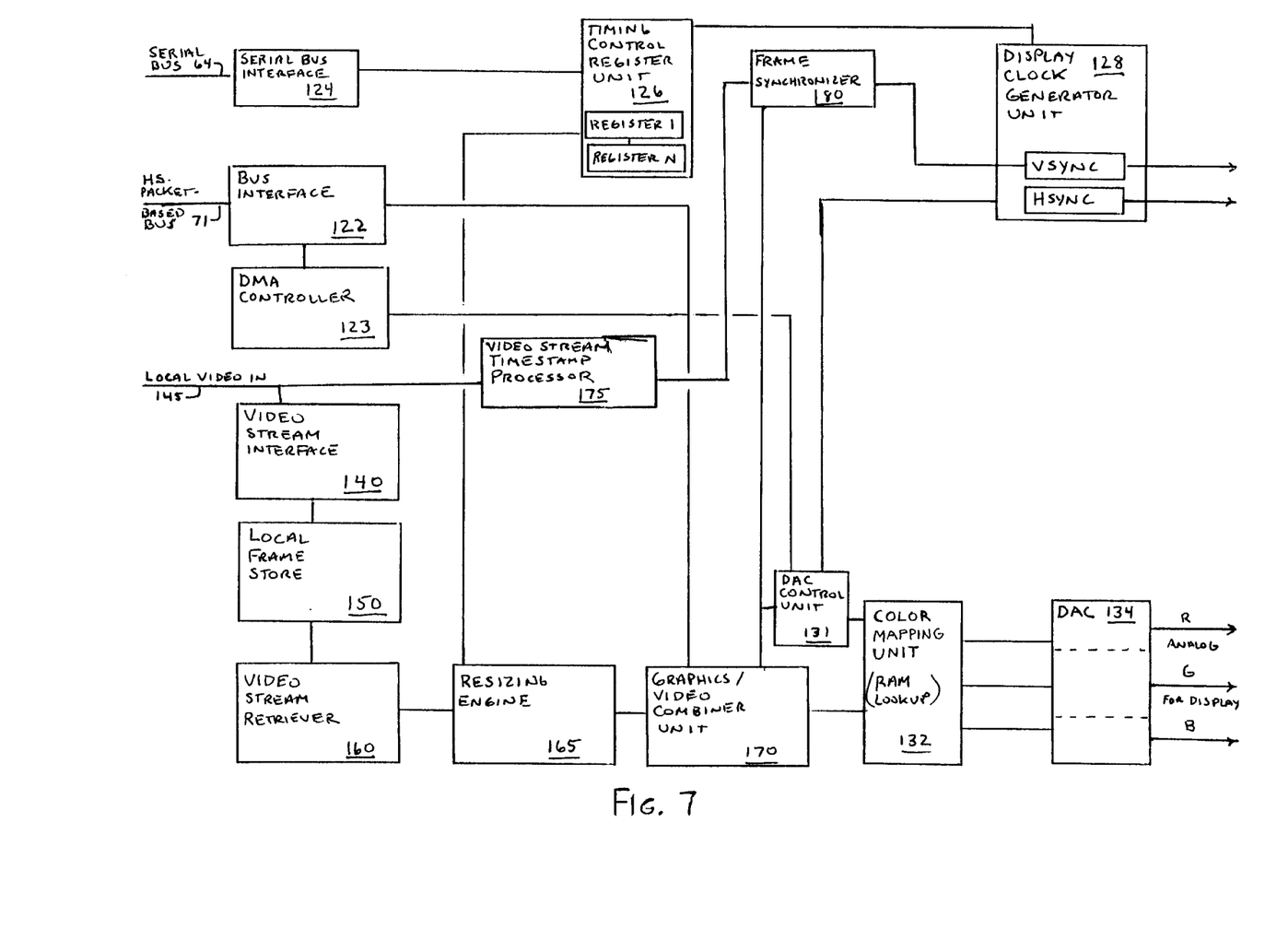
FIG. 7 is a block diagram of another embodiment of a RAMDAC including integrated video overlay circuitry.

Referring now to FIG. 7, a block diagram of an embodiment of a RAMDAC with integrated video overlay circuitry is shown. In this embodiment, the RAMDAC is a pull mode RAMDAC. It is noted however, that in other embodiments, the RAMDAC may be operated in a push mode. Circuit components that correspond to those shown in FIG. 1 through FIG. 6 are numbered identically for simplicity and clarity. This embodiment includes integrated video overlay circuitry, which advantageously allows video images to be overlaid onto the computer graphics.

A bus interface 122 is coupled to graphics processor 115 of FIG. 1, through high-speed packet-based bus 71. Bus interface 122 is also coupled to timing control register unit 126, a graphics/video combiner unit 170, and a DMA controller 123. DMA controller 123 is coupled to display clock generator unit 128. A video stream interface140 is coupled to a local frame store buffer 150. Local frame store buffer 150 is coupled to a video stream retriever 160, which is coupled to a resizing engine 165. Resizing engine 165 is coupled to graphics/video combiner unit 170. Graphics/video combiner unit 170 is coupled to a color mapping unit 132. Color mapping unit 132 is coupled to a DAC 134. Video stream interface140 receives input from a local video input 145. A video stream timestamp processor 175 also receives its input from local video input 145. Video stream timestamp processor 175 is coupled to a frame synchronizer 180, which is coupled to display clock generator unit 128.

In this embodiment, local video input 145 is shown to be a generic video input, however, other embodiments may include such video interfaces as RGB, YUV, 1394, USB 2.0 or Ilink.

As video data is streamed in through local video input 145, the video stream time stamp is captured by video stream time stamp processor 175. The time stamp is sent to frame synchronizer 180 to synchronize the time stamp and the vsync signals. The display rate may be set to an integer multiple of the video frame rate. The video frames are stored in local frame store buffer 150 by video stream interface 140. As display frames are requested by DAC 134, the video frames are retrieved from local frame store buffer 150 by video stream retriever 160 and graphics/video combiner unit 170 overlays the video data onto the display data. The resultant frame data is sent to color mapping unit 132, which provides digital RGB color values corresponding to the colors indicated by the frame data. The digital RGB outputs are provided for and converted by DAC 134 for a display.

If the display video window is resized by the user, the new video window size information is stored in timing control register unit 126 in response to commands executed by CPU 20 of FIG. 1. Resizing engine 165 mathematically resizes the video data to fit the new window size requirement.

In another embodiment, the video stream may come from a TV source. In this case, video stream interface 140 mathematically integrates the two interleaved halves of the TV data to construct one entire frame of video data. This single integrated frame is stored in local frame store buffer 150.

Figure 8:
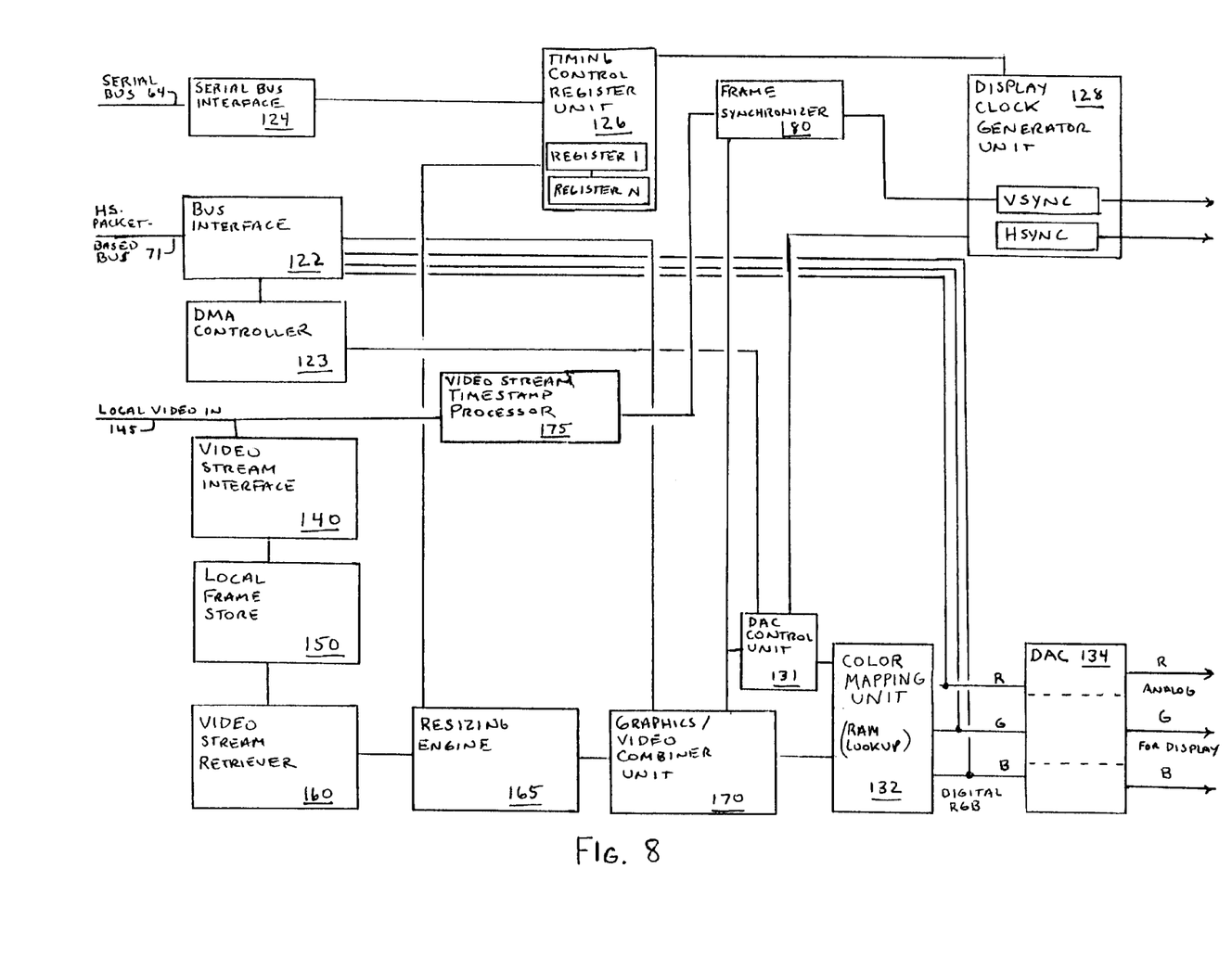
FIG. 8 is a block diagram of another embodiment of a RAMDAC including digital video display storage circuitry.

Turning now to FIG. 8, an embodiment of the RAMDAC of FIG. 7 is shown with the addition of a digital video output provided for disk storage. Circuit components that correspond to those shown in FIG. 7 are numbered identically for simplicity and clarity. The description used above to describe the operation of the circuit of FIG.7 is similar to the operation of the circuit of FIG. 8. The following is a description of the operation of the digital video output and a DMA controller 123.

A color mapping unit 132 is coupled to a bus interface 122 and DMA controller 123. The digital RGB output connections of color mapping unit 132 are routed back to bus interface 122. As digital RGB display data is provided to DAC 134, DMA controller 123 generates write cycle requests to store the digital RGB display data in a specified region of system memory. This advantageously allows the digital RGB display data to be stored on a hard disk or other storage media. This digital RGB display data may be redisplayed in the future, either alone or combined with other graphics or video images.

Figure 9:
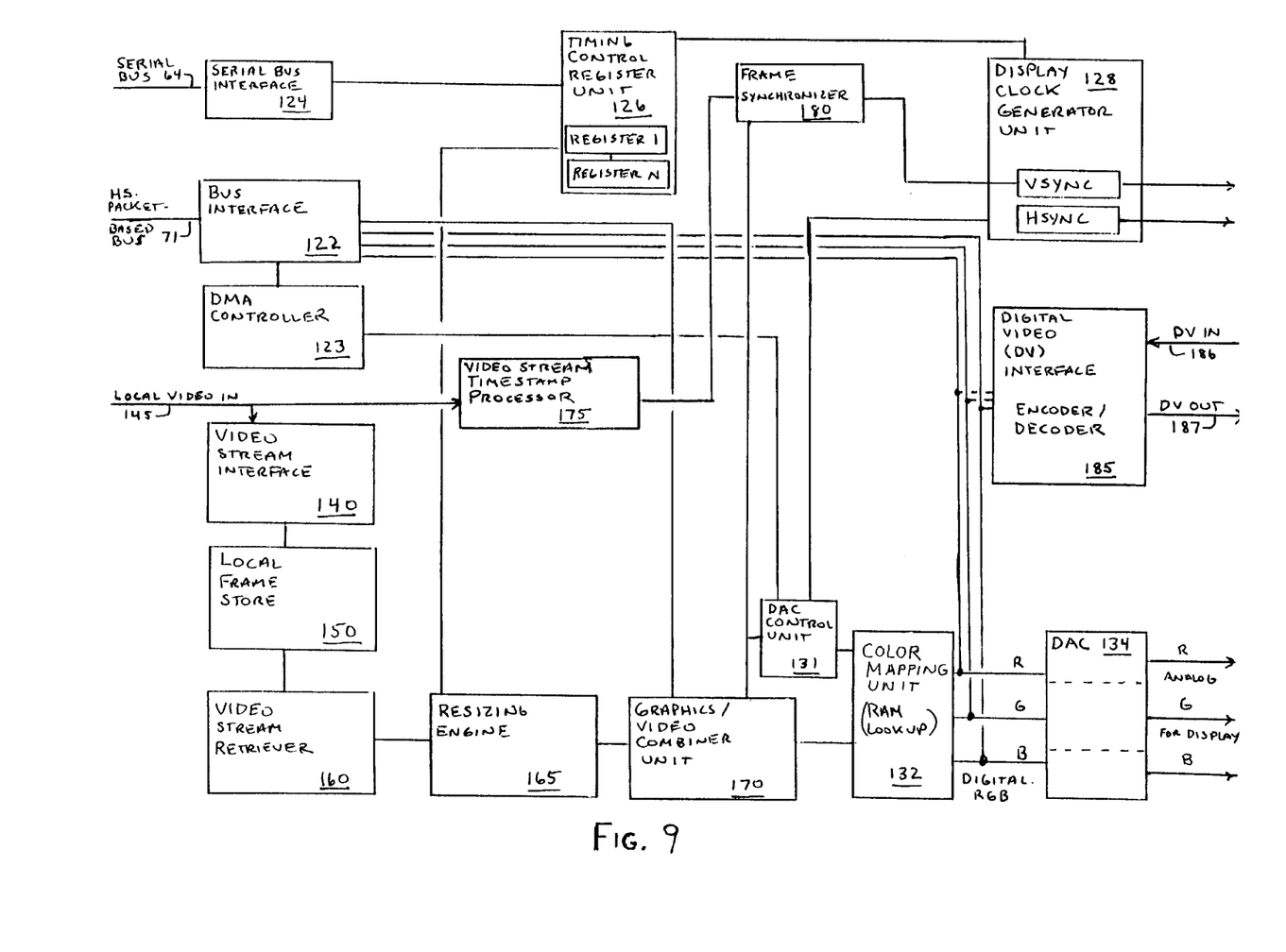
FIG. 9 is a block diagram of another embodiment of a RAMDAC including digital video compression/decompression interface circuitry.

Referring to FIG. 9, an embodiment of the RAMDAC of FIG. 8 with the addition of a Digital Video (DV) interface is shown. Circuit components that correspond to those shown in FIG. 8 are numbered identically for simplicity and clarity. The descriptions used above to describe the operation of the circuit of FIG.7 and FIG. 8 are similar to the operation of the circuit of FIG. 9. The following is a description of the operation of the Digital Video (DV) interface 185.

Digital Video (DV) interface185 is coupled to the digital RGB output connections of a color mapping unit 132. DV interface 185 receives DV encoded input from a DV input port 186. DV interface 185 provides DV encoded output through a DV output port 187.

In this embodiment, DV interface 185 compresses and decompresses the digital data using the DV encoding and decoding standard. However, other embodiments may include other standards, such as the Motion Picture Experts Group (MPEG) standard.

As digital RGB display data is provided to DAC 134 by color mapping unit 132, DV interface 185 compresses the digital RGB display data using the DV encoding standard and provides the encoded digital signal to DV output port 187 for such devices as a digital VCR. DV interface 185 also decompresses DV encoded video received from DV input port 186 and provides corresponding digital RGB display data for DAC 134 or storage on hard disk as described above in the description of the circuit of FIG. 8.

In another embodiment, the packetized nature and high bandwidth of the high-speed packet-based bus may be used advantageously to route the DV encoded signals received from DV input port 186 to the graphics processor 115 of FIG. 1 for decoding. The decoded digital RGB signal may then be sent back to the DAC for conversion to analog signals for display as described above in FIGS. 1–3. Likewise, the digital RGB display data coming out of color mapping unit 132 may be routed back to graphics processor 115 of FIG. 1 for compression using the DV encoding standard and then sent to the DV interface output port 187.

Numerous variations and modifications will become apparent to those skilled in the art once the above disclosure is fully appreciated. It is intended that the following claims be interpreted to embrace all such variations and modifications.

What is claimed is:

1. A graphics subsystem comprising:
   a graphics processor implemented on a first integrated circuit chip, wherein said graphics processor is configured to render digital image information in response to a graphics command received from a CPU and to store said digital image information in a memory;
   a conversion unit implemented on a second integrated circuit chip, wherein said conversion unit includes a color mapping unit coupled to convert said digital image information to digital RGB display data, wherein said conversion unit further includes a digital-to-analog converter coupled to convert said digital RGB display data to one or more analog signals for driving a video display; and
   a DMA controller implemented on said second integrated circuit chip, wherein said DMA controller is configured to generate read requests to retrieve said digital image information stored in said memory and to cause said digital image information to be provided to said conversion unit;
   wherein said DMA controller is further configured to generate write cycles to cause said digital RGB display data to be written to a designated memory region.

2. The graphics subsystem as recited in claim 1, wherein said color mapping unit includes a random access memory look-up table.

3. The graphics subsystem as recited in claim 1 further comprising:
   a digital video interface implemented on said second integrated circuit chip, wherein said digital video interface is coupled to said conversion unit and to said DMA controller and is configured to receive said digital RGB display data and to provide an encoded digital video output.

4. The graphics subsystem as recited in claim 3, wherein said digital video interface is further configured to receive said encoded digital video and to provide decoded digital RGB display data.

5. The graphics subsystem as recited in claim 1 further comprising:
   a display clock generator unit implemented on said second integrated circuit chip, wherein said display clock generator unit is coupled to said graphics processor and is configured to generate display timing signals for driving a video display.

6. The graphics subsystem as recited in claim 5 wherein said display timing signals include vertical and horizontal synchronization signals.

7. The graphics subsystem as recited in claim 6 further comprising:
   a programmable timing control register unit implemented on said second integrated circuit chip, wherein said programmable timing control register unit is coupled to said display clock generator unit and is configured to store display timing information.

8. The graphics subsystem as recited in claim 7, wherein said programmable timing control register unit includes a plurality of registers.

9. The graphics subsystem as recited in claim 7, wherein said display timing information includes display resolution information and vertical and horizontal refresh information.

10. The graphics subsystem as recited in claim 9 further comprising:
    a bus interface implemented on said second integrated circuit chip, wherein said bus interface is coupled to said graphics processor and is configured to receive packet-based information across a bus.

11. The graphics subsystem as recited in claim 10 further comprising:
    a video stream interface implemented on said second integrated circuit chip, wherein said video stream interface configured to provide video image frame data for storage in a second memory.

12. The graphics subsystem as recited in claim 11 further comprising:
    a graphics and video combiner unit implemented on said second integrated circuit chip, wherein said graphics and video combiner unit is coupled to said conversion unit and is configured to provide digital image information combined with video image frame data to said conversion unit.

13. The graphics subsystem as recited in claim 12 further comprising:
    a frame synchronizer, wherein said frame synchronizer is coupled to said display clock generator unit and is configured to provide a video frame synchronization signal to said graphics and video combiner unit.

14. The graphics subsystem as recited in claim 13 further comprising:
    a video stream timestamp processor, wherein said video stream timestamp processor is coupled to said frame synchronizer and is configured to provide a timestamp signal to said frame synchronizer.

15. The graphics subsystem as recited in claim 14 further comprising:
    a video stream retriever, wherein said video stream retriever is coupled to said second memory and is configured to retrieve said video image frame data stored in said second memory and to cause said video image frame data to be provided to said graphics and video combiner unit.

16. The graphics subsystem as recited in claim 15 further comprising:
    a video window resizing engine, wherein said video window resizing engine is coupled to said graphics and video combiner unit and is configured to mathematically resize said video image frame data dependent upon information stored in said programmable timing control register unit.

17. The graphics subsystem as recited in claim 11, wherein said second memory is a local frame store memory implemented on said second integrated circuit chip.

18. A computer system comprising:
    a CPU;
    a graphics subsystem coupled to said CPU including:
    a graphics processor implemented on a first integrated circuit chip, wherein said graphics processor is configured to render digital image information in response to a graphics command received from said CPU and to store said digital image information in a first memory;

a conversion unit implemented on a second integrated circuit chip, wherein said conversion unit includes a color mapping unit coupled to convert said digital image information to digital RGB display data, wherein said conversion unit further includes a digital-to-analog converter coupled to convert said digital RGB display data to one or more analog signals for driving a video display; and a DMA controller implemented on said second integrated circuit chip, wherein said DMA controller is configured to generate read requests to retrieve said digital image information stored in said first memory and to cause said digital image information to be provided to said conversion unit;

wherein said DMA controller is further configured to generate write cycles to cause said digital RGB display data to be written to a designated memory region.

19. The computer system as recited in claim 18, wherein said color mapping unit includes a random access memory look-up table.

20. The computer system as recited in claim 19 further comprising:

a system memory coupled to a memory controller, wherein said memory controller is configured to provide an interface to said system memory.

21. The computer system as recited in claim 18, wherein said first memory is allocated within a portion of said system memory.

22. The computer system as recited in claim 19, wherein said first memory is a frame buffer memory coupled to said graphics processor.

23. The computer system as recited in claim 18, wherein said graphics subsystem further comprises:

a display clock generator unit implemented on said second integrated circuit chip, wherein said display clock generator unit is coupled to said graphics processor and is configured to generate display timing signals for driving a video display.

24. The graphics subsystem as recited in claim 23, wherein said display timing signals include vertical and horizontal synchronization signals.

25. The computer system as recited in claim 24, wherein said graphics subsystem further comprises:

a programmable timing control register unit implemented on said second integrated circuit chip, wherein said programmable timing control register unit is coupled to said display clock generator unit and is configured to store display timing information.

26. The computer system as recited in claim 25, wherein said programmable timing control register unit includes a plurality of registers.

27. The computer system as recited in claim 26, wherein said display timing information includes display resolution information and vertical and horizontal refresh information.

28. The computer system as recited in claim 18, wherein said graphics subsystem further comprises:

a bus interface implemented on said second integrated circuit chip, wherein said bus interface is coupled to said graphics processor and is configured to receive packet-based information across a bus.

29. The computer system as recited in claim 28, wherein said graphics subsystem further comprises:

a video stream interface implemented on said second integrated circuit chip, wherein said video stream interface configured to provide video image frame data for storage in a second memory.

30. The computer system as recited in claim 29, wherein said graphics subsystem further comprises:

a graphics and video combiner unit implemented on said second integrated circuit chip, wherein said graphics and video combiner unit is coupled to said conversion unit and is configured to provide digital image information combined with video image frame data to said digital-to-analog converter circuit.

31. The computer system as recited in claim 30, wherein said graphics subsystem further comprises:

a frame synchronizer, wherein said frame synchronizer is coupled to said display clock generator unit and is configured to provide a video frame synchronization signal to said graphics and video combiner unit.

32. The computer system as recited in claim 31, wherein said graphics subsystem further comprises:

a video stream timestamp processor, wherein said video stream timestamp processor is coupled to said frame synchronizer and is configured to provide a timestamp signal to said frame synchronizer.

33. The computer system as recited in claim 32, wherein said graphics subsystem further comprises:

a video stream retriever, wherein said video stream retriever is coupled to said local video frame store memory and is configured to retrieve said video image frame data stored in said local video frame store memory and to cause said video image frame data to be provided to said graphics and video combiner unit.

34. The computer system as recited in claim 33, wherein said graphics subsystem further comprises:

a video window resizing engine, wherein said video window resizing engine is coupled to said graphics and video combiner unit and is configured to mathematically resize said video image frame data dependent upon information stored in said programmable timing control register unit.

35. The computer system as recited in claim 29, wherein said second memory is a local frame store memory implemented on said second integrated circuit chip.

36. The computer system as recited in claim 18, wherein said designated memory region is allocated within a portion of said system memory.

* * * * *